(12) United States Patent
Yim et al.

(10) Patent No.: US 8,929,395 B2
(45) Date of Patent: Jan. 6, 2015

(54) MULTICAST SYSTEM AND MULTICAST METHOD USING SHORTENED ADDRESS AND APPARATUS APPLIED TO THE SAME (75) Inventors: Cheol Ho Yim, Daejeon (KR); Moon Kee Kim, Yongin-si (KR); Jae Yeon Noh, Seongnam-si (KR); Jae Hwang Yu, Seoul (KR); Keun Hwan Choi, Seoul (KR); Kyung Sik Han, Yongin-si (KR); Min Seok Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 253 days.

(21) Appl. No.: 13/391,064

(22) PCT Filed: Oct. 27, 2009

(86) PCT No.: PCT/KR2009/006225
§ 371 (c)(1),
(2), (4) Date: Mar. 16, 2012

(87) PCT Pub. No.: WO2011/021744
PCT Pub. Date: Feb. 24, 2011

(65) Prior Publication Data
US 2012/0170579 A1    Jul. 5, 2012

(30) Foreign Application Priority Data
Aug. 18, 2009   (KR) .......................... 10-2009-0076279

(51) Int. Cl.
H04J 3/24       (2006.01)
H04W 4/08       (2009.01)
H04W 8/18       (2009.01)

(52) U.S. Cl.
CPC .............. *H04W 4/08* (2013.01); *H04W 8/186* (2013.01); *Y02B 60/50* (2013.01)
USPC ........................................ 370/471; 370/475

(58) Field of Classification Search
USPC .......................... 370/310–350, 471, 475, 476
See application file for complete search history.

(56) References Cited

U.S. PATENT DOCUMENTS

| | | | | |
|---|---|---|---|---|
| 2006/0198353 | A1* | 9/2006 | Wason et al. | 370/347 |
| 2009/0052467 | A1* | 2/2009 | Kaidar et al. | 370/469 |
| 2009/0073972 | A1* | 3/2009 | Lee et al. | 370/389 |
| 2009/0290522 | A1* | 11/2009 | Zhou | 370/312 |

FOREIGN PATENT DOCUMENTS

| | | |
|---|---|---|
| KR | 10-0420667 | 3/2004 |
| KR | 10-2009-0018661 | 2/2009 |

OTHER PUBLICATIONS

International Search Report mailed Sep. 16, 2010 for PCT/KR2009/006225.

* cited by examiner

*Primary Examiner* — Ricky Ngo
*Assistant Examiner* — Wei-Po Kao
(74) *Attorney, Agent, or Firm* — Lowe Hauptman & Ham, LLP

(57) ABSTRACT

Disclosed is a multicast system and a multicast method using a shortened address and an apparatus applied to the same. The multicast system using the shortened address according to the present disclosure has a address configuration for supporting a multicast in an IEEE 802.15.4 MAC (Medium Access Control) layer. Accordingly, when a device processes a multicast through an address configuration of the MAC layer, the device receives the multicast through a simple scheduling such as receiving a beacon signal of a coordinator device only when there is a broadcast of a group including the device. As a result, the device can efficiently perform the multicast in a power managing process or a power processing process.

8 Claims, 7 Drawing Sheets

A Class Group Addressing

B Class Group Addressing

C Class Group Addressing

D Class Group Addressing

MULTICAST SYSTEM AND MULTICAST METHOD USING SHORTENED ADDRESS AND APPARATUS APPLIED TO THE SAME

CROSS REFERENCE TO RELATED APPLICATION

This application claims the priority of Korean Patent Application No. 10-2009-0076279, filed on Aug. 18, 2009 in the KIPO (Korean Intellectual Property Office). Further, this application is the National Phase application of International Application No. PCT/KR2009/006225, filed on Oct. 27, 2009, which designates the United States and was published in Korean.

FIELD OF THE INVENTION

The present invention relates to a multicast system and a multicast method using a local area network based on a shortened address and an apparatus applied to the same. More particularly, the present invention relates to a multicast system and a multicast method using a local area network based on a shortened address for supporting a multicast in an IEEE 802.15.4 MAC (Medium Access Control) layer and an apparatus applied to the same.

DESCRIPTION OF THE PRIOR ART

An IEEE 802.15.4 standard defines a communication method in a WPAN (Wireless Personal Area Network) configured by an FFD (Full Function Device) and an RFD (Reduced Function Device).

The IEEE 802.15.4 standard is operated in the form of a star topology or a peer-to-peer topology, and the star topology is a topology in which one of the FFDs becomes a coordinator device to manage and control a plurality of other devices.

The coordinator device is operated as a start point and an end point of communication in a WPAN and also is operated as a router.

All devices have their inherent 64 bit extension addresses which are basically used in a communication. Further, devices connected through a coordinator device within a WPAN have been assigned a 16 bit of shortened address, which can be used in a WPAN which the devices currently connected to.

Further, each WPAN has an Identifier (ID) so that the WPAN can be distinguished by the WPAN ID and communication is possible within the WPAN by using the 16 bit of shortened address.

There are two types of a data transmission method such as a unicast, a broadcast, and a multicast according to the number of transmitters and receivers.

A unicast is a communication type in which one transmitter transmits data to one receiver, and a broadcast is a communication type in which one transmitter simultaneously transmits data in all receivers in the same network.

Lastly, a multicast is a communication type in which one transmitter transmits data only to a plurality of receivers belonging to a particular group. A multicast is often used for a streaming media service or internet TV and so on.

Currently, the IEEE 802.15.4 MAC layer does not support multicast. A Zigbee using the IEEE 802.15.4 forms a group table in a Zigbee network layer to support multicast, but it is based on the peer-to-peer topology.

Further, a Zigbee multicast is based on a multi hop environment so that it is required to develop a multicast technology in which a coordinator device transmits data only to a particular group in the star topology.

Therefore, the necessity for a solution to the problems arises.

SUMMARY OF THE INVENTION

Accordingly, the present invention has been made to solve the above-mentioned problems occurring in the prior art, and an aspect of the present invention provides a multicast system and a multicast method using a local area network based shortened address, which makes a multicast possible in an IEE 802.15.4 MAC (Medium Access Control) layer, and an apparatus applied to the same.

Further, another aspect of the present invention provides a multicast system and a multicast method using a shortened address, which a 16 bit of shortened addresses is classified to hierarchically form multimedia addresses, and an apparatus applied to the same.

Furthermore, another aspect of the present invention provides a multicast system and a multicast method using a shortened address, which transmit and receive a multimedia frame generated in an IEEE 802.15.4 MAC (Medium Access Control) layer, and an apparatus applied to the same.

Moreover, another aspect of the present invention provides a multicast system and a multicast method using a shortened address, which can support both a multicast and a unicast by using a 16 bit of shortened address, and an apparatus applied to the same.

In accordance with an aspect of the present invention, there is provided a multicast system using a shortened address, the multicast system comprising: one or more devices for configuring a local area network; and a coordinator device for allocating a shortened address in response to an access of the device or a request for allocating group based on a group table formed in a local area network layer, and classifying the shortened address, thereby reallocating a multicast address for multicasting to one or more target groups.

The local area network may include a star topology structure.

The shortened address may include a 16 bit of shortened address.

In accordance with another aspect of the present invention, there is provided a coordinator device of a multicast system using a shortened address, the coordinator device comprising: a storage configured to store a group table formed in a local area network layer; a local area communication unit configured to communicate with one or more devices configuring a local area network; a first address allocator for allocating a shortened address in response to an access of the device or a request for allocating group using the group table; and a second address allocator for classifying the shortened address, thereby reallocating a multicast address for multicasting to one or more target groups.

The shortened address may include a first bit section for classifying the type of address, a second bit section for setting classes, a third bit section for allocating an ID of a group, and a fourth bit section for allocating an ID of a device.

The shortened address may be divided into the multicast address and a unicast address according to a bit value input to the first bit section.

The number of bits, which can be allocated to the third bit section and the fourth bit section, may vary depending on the class set in the second bit section.

When the number of group is equal to or more than a predetermined number of group according to the class set in the second bit section and the number of device is equal to or less than a predetermined number of device according to the class set in the second bit section, the number of bits of the third bit section may be increased to a preset number of bits and the number of bits of the fourth bit section may be reduced to a preset number of bits.

When the number of group is equal to or less than a predetermined number of group according to the class set in the second bit section and the number of device is equal to or more than a predetermined number of device according to the class set in the second bit section, the number of bits of the third bit section may be reduced to a preset number of bits and the number of bits of the fourth bit section may be increased to a preset number of bits.

The second address allocator sets the first bit section as the multicast address, inputs an ID of a group corresponding to the target group in the third bit section, and inputs identical bit values in all bits of the fourth bit section, so that the multicast address allocated.

In accordance with another aspect of the present invention, there is provided a multicast method using a shortened address, the multicast method comprising:

allocating a shortened address in response to an access or a request for allocating group of a device configuring a local area network based on a group table formed in a local area network layer; and classifying the shortened address, thereby reallocating a multicast address for multicasting to one or more target groups.

In accordance with another aspect of the present invention, there is provided a method of forming a multicast address using a shortened address, the method comprising: forming a shortened address divided into a first bit section for classifying the type of address, a second bit section for setting classes, a third bit section for allocating a group ID, and a fourth bit section for allocating a device ID; setting the type of address by inputting a bit value of a multicast address in the first bit section; setting a class such that the number of bits, which can be allocated to the third bit section and the fourth bit section, varies depending on the setting of the class input in the second bit section; inputting an ID of a target group for a multicast in each bit of the third bit section; and forming the multicast address by inputting identical bit values in bits of the fourth bit section.

In accordance with another aspect of the present invention, there is provided a method of transmitting and receiving a multicast frame, the method comprising:

initially accessing a local area network or requesting for a multicast of a target group by one or more devices for configuring a local area network; receiving an allocation of a shortened address from a coordinator device processing a resource of the device; identifying a Guaranteed Time Slot (GTS) period of a superframe period through a beacon signal transmitted from the coordinator device; and receiving a multicasted frame when a multicast is reserved for the GTS period for the target group including the device.

According to the present invention, the multicast system supports a multicast in an IEEE 802.15.4 MAC (Medium Access Control) layer, so that there is an advantage in that, when a device processes a multicast through an address system of the MAC layer, the device does not use a method of identifying all data in the MAC layer, identifying a group table in a higher network layer, and processing the multicast, but the device receives the multicast through a simple scheduling such as receiving a beacon signal of a coordinator device only when there is a broadcast of a group including the device. As a result, the device can efficiently perform the multicast in a power managing process or a power processing process.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, an exemplary embodiment of the present invention will be described with reference to the accompanying drawings. In the following description and drawings, the same reference numerals are used to designate the same or similar components, and so repetition of the description on the same or similar components will be omitted.

Figure 1:
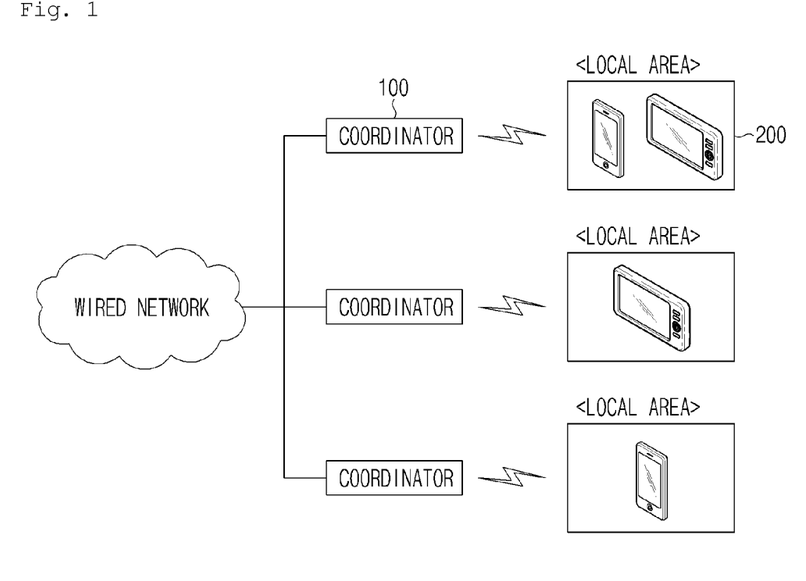
FIG. 1 is a diagram of a multicast system using a shortened address according to an embodiment of the present invention.

FIG. 1 is a diagram of a multicast system using a shortened address according to an embodiment of the present invention. As shown in FIG. 1 as only an example, the multicast system using a shortened address comprises devices 200, wherein the devices 200 is connected to a local area network such as an IEEE 802.15.4 through a coordinator in the local area network. A shortened address is assigned to the devices 200 and the devices 200 communicate within the connected local area network using the shortened address. The shortened address is allocated according to a multicast group, so that it is possible to support a multicast without a separate signaling process.

Therefore, it is preferred that the local area network includes a star topology structure.

Further, it is preferred that the shortened address includes a 16 bit of shortened address.

A coordinator device 100 allocates a shortened address (for example, a 16 bit shortened address, hereinafter referred to as a "16 bit shortened address") using a group table in a network layer of local area communication as a response to an access of the device 200 or a request for an allocation to a predetermined group. Then, the coordinator device 100 classifies the allocated 16 bit shortened address according to service characteristics and reallocates a multicast address to one or more target groups for multicasting.

Figure 2:
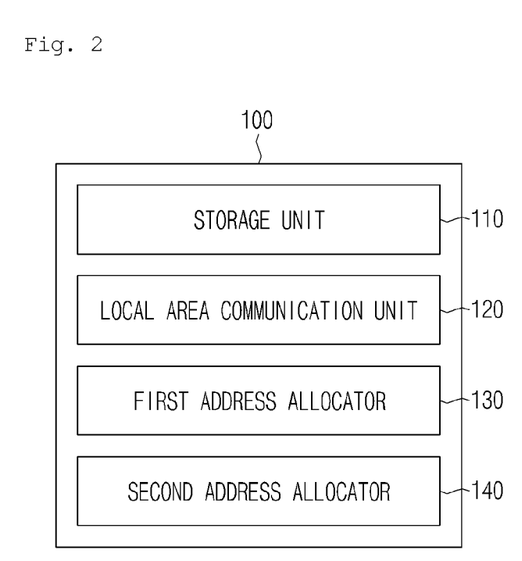
FIG. 2 is a diagram of a coordinator device as shown in FIG. 1.

FIG. 2 is a diagram of the coordinator device shown in FIG. 1. As shown in FIG. 2 as only an example, in more detail, the coordinator device 100 includes a storage unit configured to store a group table configured in a network layer for local area communication, a local area communication unit configured to communicate with one or more devices 200 included in a local area network, a first address allocator for allocating a shortened address to a group based on the group table in response to an access of the device 200 or a request for an allocation, and a second address allocator for classifying the shortened addresses according to service characteristics and reallocating a multicast address to one or more target groups for multicasting.

Figure 3:
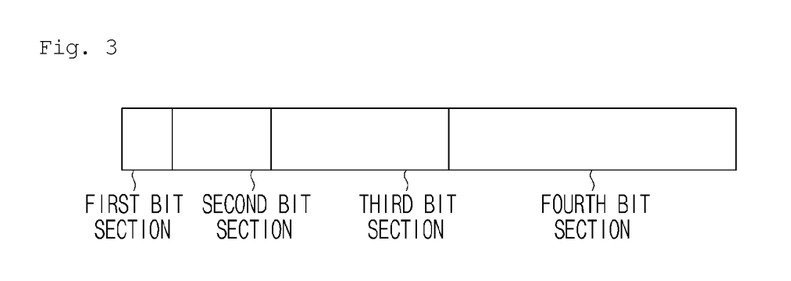
FIG. 3 illustrates a hierarchical structure of a shortened address allocated to a device as shown in FIG. 1.

FIG. 3 illustrates a hierarchical structure of a shortened address allocated to the device 200 shown in FIG. 1. As shown in FIG. 3 as only an example, a 16 bit shortened address includes a first bit section for designating a type of addresses, a second bit section for setting classes according to service characteristic, a third bit section for allocating group IDs, and a fourth bit section for allocating an ID of the device 200.

The first bit section corresponds to a first bit of the 16 bit shortened address. The 16 bit shortened address may be set as an address for a multicast when the first bit is "0" and the 16 bit shortened address may be set as an address for a unicast when the first bit is "1".

Here, when the device 100 is already registered in the coordinator device 100 as a group member of a certain group, an address for a multicast can be allocated to the devices at the time of connection although the device 100 is connected for the first time.

Figure 4:
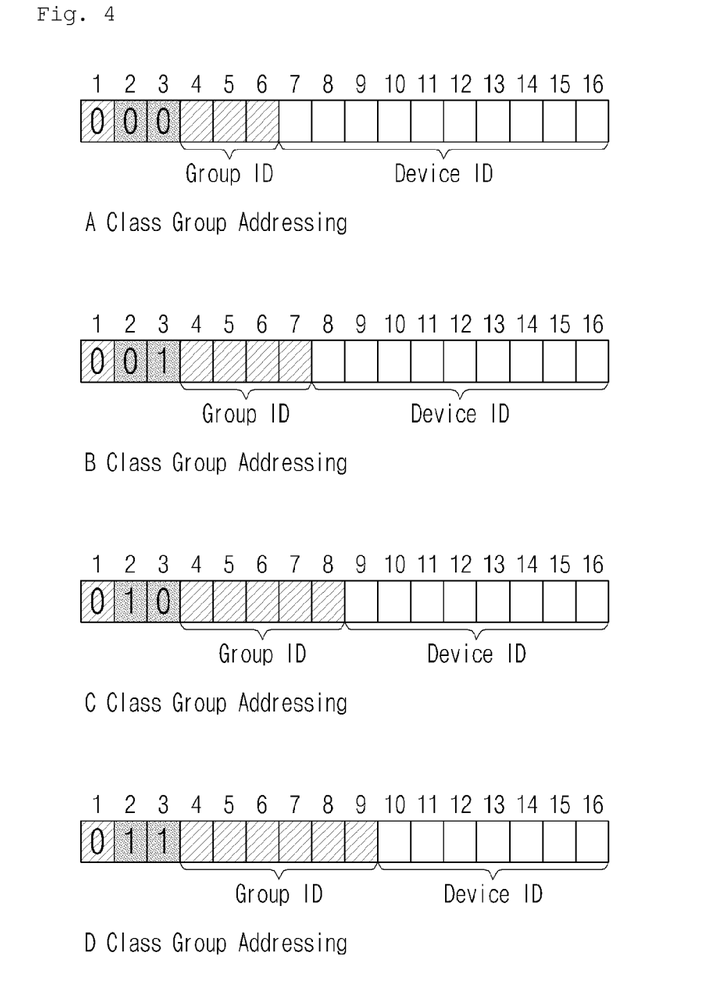
FIG. 4 illustrates an address system set according to a class input to a second bit section as shown in FIG. 3.

FIG. 4 illustrates an address configuration according to the class set in the second bit section shown in FIG. 3. As shown in FIG. 4 as only an example, when the value of the second and third bits of the 16 bit shortened address is "00", it indicates a class A address and can accommodate the largest number of devices 200.

That is, in the class A address, the following three (4-6) bits indicate inherent group IDs and the remaining ten (7-16) bits are allocated as IDs of the devices 200.

Whereas when the value of the second and third bits is "01", it indicates a class B address. In this case, the following four (4-7) bits are used as group IDs and the remaining nine (8-16) bits are allocated as IDs of the devices 200.

In a similar way, when the value of the second and third bits is "10", it indicates a class C address. In this case, the following five (4-8) bits are used as group IDs and the remaining eight (9-16) bits are used as IDs of the devices 200.

Lastly, when the value of the second and third bits is "11", it indicates a class D address. In this case, the following six (4-9) bits are used as group IDs and the remaining seven (10-16) bits are used as IDs of the devices 200.

The class D address can accommodate the smallest number of devices 200 but the largest number of group IDs, so that it is possible to form various multicast groups.

An address system for the A to D class groups has a characteristic of allocating addresses as shown in table 1.

TABLE 1

|  | A class group | B class group | C class group | D class group |
|---|---|---|---|---|
| Number of Groups | 8 | 16 | 32 | 64 |
| Number of Devices | 1024 | 512 | 256 | 128 |

In the address configuration for each classes, the 16 bit shortened address allocated to each device 200 is an unique ID of each device 200, which enables communication in the same way as the conventional IEEE 802.15.4.

When used for the unicast, the allocated 16 bit shortened address is used as a transmitting side address or a receiving side address without any change. When used for the multicast, the third bit section for the group IDs is set to be target group ID and all the bits of the fourth bit section for the devices 200 IDs are set to be "1", so that it supports a multicast for transmitting packets to all devices 200 of the target group.

Figure 5:
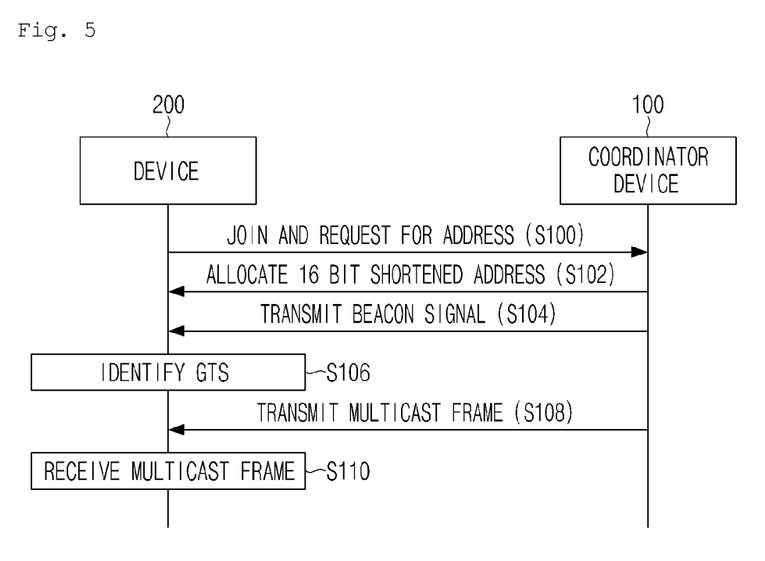
FIG. 5 is a flowchart illustrating an operation process of a multicast system using a shortened address as shown in FIG. 1.

FIG. 5 is a flowchart illustrating an operation process of a multicast system using the shortened address shown in FIG. 1. As shown in FIG. 5 as only an example, a method of transmitting and receiving a multicast frame is initiated when one or more devices 200 included in a local area network first access the local area network for the first time or make a request for receiving a multicast of a target group for the coordinator device 100 (S100).

In response to this, the coordinator device 100 allocates 16 bit shortened address (S102).

Next, the device 200 identifies a Guaranteed Time Slot (GTS) period of a superframe through a beacon signal transmitted from the coordinator device 100 (S104 and S106).

When the GTS period is reserved for the multicast for a target group including the device 200, the device 200 receives a multicasted frame (S108 and S110).

When the GTS is reserved for the multicast for a target group not including the device 200, the multicasted frame does not transmitted to the devices 200.

Figure 6:
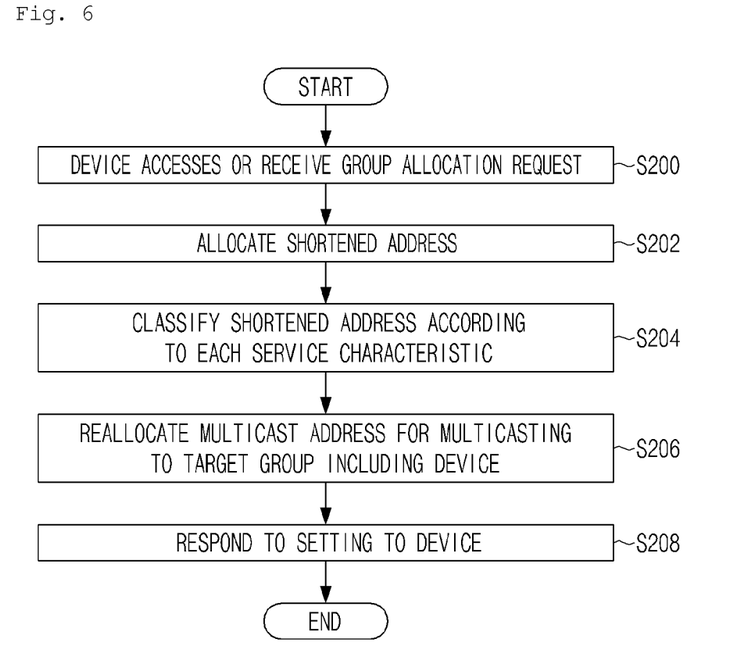
FIG. 6 is a flowchart illustrating an embodiment of a process of allocating a multicast address by using a shortened address in the process shown in FIG. 5.

FIG. 6 is a flowchart illustrating an embodiment of a process of allocating a multicast address using the shortened address in the process shown in FIG. 5. As shown in FIG. 6 as only an example, a process of allocating the multicast address using the shortened address is initiated when the device 200 accesses the coordinator device 100 or the coordinator device 100 receives a request for allocating the address to groups from the device 100 (S200).

The coordinator device 100 allocates the 16 bit shortened address to the device 200 (S202), classifies the 16 bit shortened address according to service characteristic, and then reallocates a multicast address for multicasting to a target group including the device 200 (S204 and S206).

Next, the coordinator device 100 responds to the device 200 based on the multicast address (S208).

Figure 7:
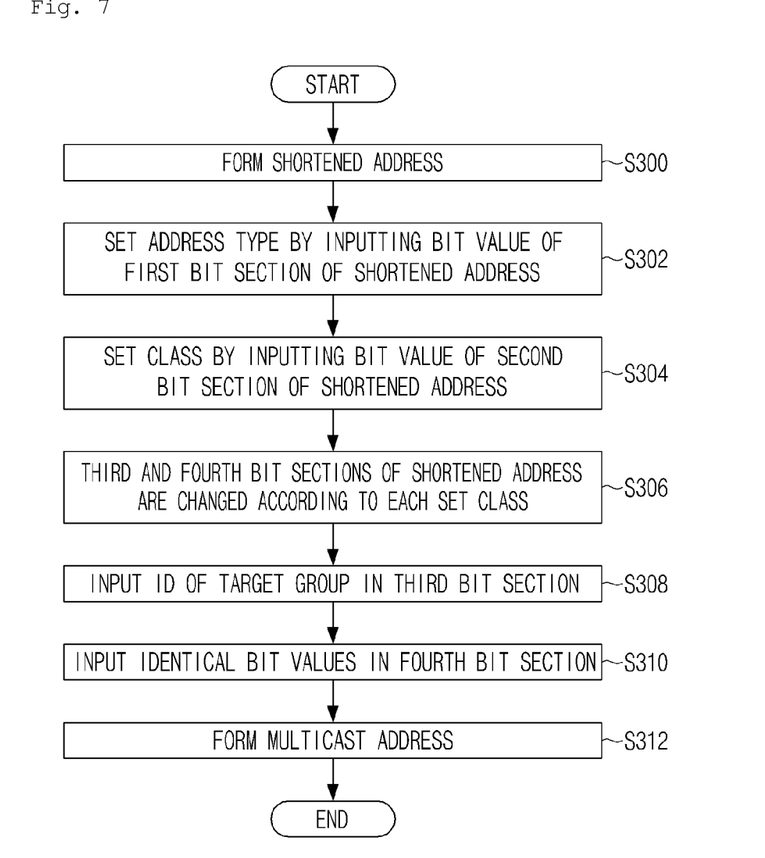
FIG. 7 is a flowchart illustrating in more detail a process of forming a multicast address in the process shown in FIG. 6.

FIG. 7 is a flowchart illustrating in more detail a process of forming a multicast address in the process shown in FIG. 6. As shown in FIG. 7 as only an example, referring to the process of forming the multicast address in more detail, the coordinator device 100 forms the 16 bit shortened address including the first bit section for designating the type of address in response to a request of the device 200, the second bit section for setting classes classified according to each service characteristic, the third bit section for allocating a group ID, and the fourth bit section for allocating an ID of the device 200 (S300).

Next, when the first bit section which is the first bit of 16 bit shortened address is set as "0", the 16 bit shortened address is identified as an address for the multicast. When the first bit section is set as "1", the 16 bit shortened address is identified an address for the unicast (S302).

Further, when the second bit section which is second and third bits of the 16 bit shortened address is set as "00", the 16 bit shortened address is classified as a class A address, which can accommodate the largest number of devices 200 in one multicast group. When the value of the second bit section is set as "01", the 16 bit shortened address is classified as a class B address. When the value of the second bit section is input as "10", the 16 bit shortened address is classified as a class C address. When the value of the second bit section is designated as "11", the 16 bit shortened address is classified as a class D address (S304).

After setting classes in S304, the number of bits, which can be input in the third bit section and the fourth bit section of the 16 bit shortened address, is determined and set (S306) according the classes.

Next, an ID of a target group is input in the third bit section (S308) and a value of "1" (or "0") is set in the fourth bit section. As a result, a multicasted packet is transmitted to all the devices 200 having the ID of the target group (S308 to S312).

Although an exemplary embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention supports the multicast in the IEEE 802.15.4 MAC (Medium Access Control) layer, and the present invention has industrial applicability since it has great potential in commercialization and can be clearly implemented in reality.

What is claimed is:

1. A coordinator device of a multicast system using a local area network based on a shortened address, the coordinator device comprising:
  a storage unit configured to store a group information on a group of a group table, the group formed in the local area network;
  a local area network communication unit configured to communicate with at least one device included in the local area network;
  a first address allocator configured to
    form a shortened address by classifying a type of address, setting a class, allocating a group ID, and allocating a device ID based on the group information and
    allocate the shortened address to the at least one device; and
  a second address allocator configured to form a multicast address based on the shortened address and reallocate the multicast address for multicasting to one or more target groups,
  wherein the second address allocator is configured to form the multicast address based on the shortened address by
    setting the type of address by inputting a bit value of the multicast address in a first bit section of the shortened address,
    setting the class in a second bit section such that the number of bits, which is allocated to a third bit section and a fourth bit section of the shortened address, varies depending on the setting of the class input in the second bit section of the shortened address,
    inputting the group ID of a target group for a multicast in each bit of the third bit section of the shortened address, and
    forming the multicast address by inputting identical bit values in bits of the fourth bit section of the shortened address.

2. The coordinator device as claimed in claim 1, wherein the shortened address includes the first bit section for classifying the type of address, the second bit section for setting the class, the third bit section for allocating the group ID, and the fourth bit section for allocating the device ID.

3. The coordinator device as claimed in claim 2, wherein the shortened address is divided into the multicast address and a unicast address according to the bit value input to the first bit section.

4. A coordinator device of a multicast system using a local area network based on a shortened address, the coordinator device comprising:
  a storage unit configured to store a group information on a group of a group table, the group formed in the local area network;
  a local area network communication unit configured to communicate with at least one device included in the local area network;
  a first address allocator configured to
    form a shortened address by classifying a type of address, setting a class, allocating a group ID, and allocating a device ID based on the group information and
    allocate the shortened address to the at least one device; and
  a second address allocator configured to form a multicast address based on the shortened address and reallocate the multicast address for multicasting to one or more target groups,
  wherein the shortened address includes the first bit section for classifying the type of address, the second bit section for setting the class, the third bit section for allocating the group ID, and the fourth bit section for allocating the device ID,
  wherein the number of bits, which is allocated to the third bit section and the fourth bit section, varies depending on the class set in the second bit section, and
  wherein, when the number of groups is equal to or more than a predetermined number of groups according to the class set in the second bit section and the number of devices is equal to or less than a predetermined number of devices according to the class set in the second bit section, the number of bits of the third bit section is increased to a preset number of bits and the number of bits of the fourth bit section is reduced to a preset number of bits.

5. A coordinator device of a multicast system using a local area network based on a shortened address, the coordinator device comprising:
  a storage unit configured to store a group information on a group of a group table, the group formed in the local area network;
  a local area network communication unit configured to communicate with at least one device included in the local area network;
  a first address allocator configured to
    form a shortened address by classifying a type of address, setting a class, allocating a group ID, and allocating a device ID based on the group information and
    allocate the shortened address to the at least one device; and
  a second address allocator configured to form a multicast address based on the shortened address and reallocate the multicast address for multicasting to one or more target groups,
  wherein the shortened address includes the first bit section for classifying the type of address, the second bit section for setting the class, the third bit section for allocating the group ID, and the fourth bit section for allocating the device ID,
  wherein the number of bits, which is allocated to the third bit section and the fourth bit section, varies depending on the class set in the second bit section, and
  wherein when the number of groups is equal to or less than a predetermined number of groups according to the class set in the second bit section and the number of devices is equal to or more than a predetermined number of devices according to the class set in the second bit section, the number of bits of the third bit section is reduced to a preset number of bits and the number of bits of the fourth bit section is increased to a preset number of bits.

6. A multicast method using a shortened address, the multicast method performed by a computer comprising:
   allocating, by the computer, a shortened address based on a group information on a group of a group table;
   classifying, by the computer, the shortened address based on a service characteristic; and
   reallocating, by the computer, a multicast address for multicasting to one or more target groups based on the classifying,
   wherein the classifying of the shortened address comprises
      forming the shortened address including a first bit section for classifying the type of address, a second bit section for setting a class, a third bit section for allocating a group ID, and a fourth bit section for allocating a device ID, and
   wherein the reallocating of the multicast address comprises
      setting the type of address by inputting a bit value of the multicast address in the first bit section;
      setting the class in the second bit section such that the number of bits, which is allocated to the third bit section and the fourth bit section, varies depending on the set class;
      inputting the group ID of a target group for a multicast in the third bit section; and
      forming the multicast address by inputting identical bit values in bits of the fourth bit section.

7. A method of forming a multicast address using a shortened address, the method performed by a computer comprising:
   forming, by the computer, a shortened address including a first bit section for classifying the type of address, a second bit section for setting a class, a third bit section for allocating a group ID, and a fourth bit section for allocating a device ID;
   setting, by the computer, the type of address by inputting a bit value of a multicast address in the first bit section;
   setting, by the computer, the class in the second bit section such that the number of bits, which is allocated to the third bit section and the fourth bit section, varies depending on the setting of the class input in the second bit section;
   inputting, by the computer, the group ID of a target group for a multicast in each bit of the third bit section; and
   forming, by the computer, the multicast address by inputting identical bit values in bits of the fourth bit section.

8. A method of transmitting and receiving a multicast frame, the method comprising:
   accessing a local area network or requesting for a multicast of a target group by at least one device;
   receiving a shortened address from a coordinator device;
   identifying a Guaranteed Time Slot (GTS) period of a superframe period through a beacon signal transmitted from the coordinator device; and
   receiving a multicasted frame when a multicast is reserved for the GTS period for the target group including the at least one device,
   wherein the shortened address received from the coordinator device including a first bit section for classifying the type of address, a second bit section for setting a class, a third bit section for allocating a group ID, and a fourth bit section for allocating a device ID, and
   wherein the multicast frame includes a multicast address reallocated by the coordinator device by
      setting the type of address by inputting a bit value of the multicast address in the first bit section;
      setting the class in the second bit section such that the number of bits, which is allocated to the third bit section and the fourth bit section, varies depending on the set class;
      inputting the group ID of a target group for a multicast in the third bit section; and
      forming the multicast address by inputting identical bit values in bits of the fourth bit section.

* * * * *